(12) United States Patent
Stambaugh et al.

(10) Patent No.: US 9,754,500 B2
(45) Date of Patent: Sep. 5, 2017

(54) CURRICULUM ASSESSMENT

(71) Applicants: Elijah Stambaugh, North Jackson, OH (US); Robert L. Adduci, Hubbard, OH (US); Steven C. Mitchell, Iowa City, IA (US); Patrick Michael Kellen, Iowa City, IA (US)

(72) Inventors: Elijah Stambaugh, North Jackson, OH (US); Robert L. Adduci, Hubbard, OH (US); Steven C. Mitchell, Iowa City, IA (US); Patrick Michael Kellen, Iowa City, IA (US)

(73) Assignee: The Learning Egg, LLC, North Jackson, OH (US)

( * ) Notice: Subject to any disclaimer, the term of this patent is extended or adjusted under 35 U.S.C. 154(b) by 281 days.

(21) Appl. No.: 13/948,755

(22) Filed: Jul. 23, 2013

(65) Prior Publication Data
US 2014/0030686 A1    Jan. 30, 2014

Related U.S. Application Data

(60) Provisional application No. 61/675,579, filed on Jul. 25, 2012.

(51) Int. Cl.
G09B 7/06    (2006.01)
G09B 5/00    (2006.01)

(52) U.S. Cl.
CPC    *G09B 5/00* (2013.01); *G09B 7/06* (2013.01)

(58) Field of Classification Search
CPC .......................................................... G09B 7/06
USPC .......................................................... 434/322
See application file for complete search history.

(56) References Cited

U.S. PATENT DOCUMENTS

| | | | |
|---|---|---|---|
| 2004/0121298 A1* | 6/2004 | Creamer | G09B 7/02 434/322 |
| 2006/0003306 A1* | 1/2006 | McGinley | G09B 3/00 434/350 |
| 2006/0111902 A1* | 5/2006 | Julia | G09B 5/06 704/236 |
| 2010/0330541 A1* | 12/2010 | Krakowski | G09B 7/00 434/129 |
| 2011/0279228 A1* | 11/2011 | Kumar | G09B 7/00 340/5.83 |

* cited by examiner

*Primary Examiner* — Thomas Hong
(74) *Attorney, Agent, or Firm* — Walter | Haverfield LLP; James J. Pingor

(57) ABSTRACT

One or more embodiments of techniques or systems for curriculum assessment are provided herein. One or more assessments can be generated. For example, an assessment can be generated based on one or more forms. In this way, assessments can be created in a structured manner and distributed accordingly. One or more of the assessments may be administered. After one or more students or test takers take the assessments, one or more of the assessments can be analyzed or aggregated. Analysis can include statistical analysis related to one or more similar, related, or associated assessments. In this manner, curriculum assessment can be provided, thereby enhancing teaching efficiency and productivity, etc.

23 Claims, 13 Drawing Sheets

CURRICULUM ASSESSMENT

CROSS-REFERENCE TO RELATED APPLICATIONS

This application claims the benefit of U.S. Provisional Patent Application Ser. No. 61/675,579 entitled "CURRICULUM ASSESSMENT", filed on Jul. 25, 2012. The entirety of the above-noted application is incorporated by reference herein.

BACKGROUND

Computerized recognition techniques can be employed to decrease human workload and increase efficiency of individuals in a variety of fields. For example, text, image, and speech recognition technologies can be used to automate or enhance one or more tasks while increasing the speed at which a worker can proceed with others. Additionally, technologies relating to the generation and representation of statistics can also facilitate realization of productivity gains, independently or in conjunction with recognition techniques. However, utilization of these and other techniques may be awkwardly applied or absent in one or more functional areas and industries.

SUMMARY

This summary is provided to introduce a selection of concepts in a simplified form that are described below in the detailed description. This summary is not intended to be an extensive overview of the claimed subject matter, identify key factors or essential features of the claimed subject matter, nor is it intended to be used to limit the scope of the claimed subject matter.

One or more embodiments of techniques or systems for curriculum assessment are provided herein. A creation component can be configured to create one or more assessments. For example, the creation component can create an assessment with one or more multiple choice questions, one or more essay questions, one or more short answer questions, one or more matching questions, one or more fill in the blank questions, etc. According to one or more aspects, one or more portions of one or more of the assessments can be created from a question bank or a question database. One or more of the assessments can be a digital or electronic assessment or a physical (e.g., traditional or paper) assessment. An assessment can include one or more input areas, such as an area that can be "filled out", for example. An input area can be a part of an assessment that allows a student to respond to a question. For example, physical assessments can be "filled out" using a pen, pencil, marker, writing utensil, etc., while electronic or digital assessments can be "filled out" by a keyboard, by typing, a mouse, one or more input devices, one or more selection or pointer devices, etc.

In one or more embodiments, an assessment or form can be tailored for multiple uses (e.g., the same form given to a plurality of entities completing the assessment), permitting an individual use to facilitate a variety of idiosyncratic inputs. A variety of embodiments for such forms or assessments can be designed for one or more applications or classes by creating different combinations of questions, a number of questions, formatting assessments according to one or more arrangements (e.g., having a first input area arranged before a second input area in a first assessment and having the second input area arranged before the first input area in a second assessment), etc.

A capture component can be configured to receive or capture one or more assessee responses for an assessment. In one or more embodiments, a capture component can capture an image of the assessment. That is, the capture component can be a scanner, copier, etc. configured to scan one or more assessments or capture one or more corresponding assessment images. In other embodiments, the capture component can be a camera configured to capture one or more of the assessment images. These assessment images can be stored in a storage component.

An assessment component can assess or grade one or more portions of an assessment. For example, the capture component can align an assessment using one or more registration marks on an assessment when a corresponding assessment image is captured by the capture component. This enables the assessment component to determine an orientation for the assessment and compare one or more portions of the assessment to an answer key. In one or more embodiments, one or more portions of the assessment may be presented to faculty, a grader, a teacher, a professor, an assessor, educators, supervisors, administrators, licensors, etc. for grading by the assessment component.

For example, if the second question of an assessment is an essay question, the assessment component can present one or more assessee responses to the second question or a corresponding portion of one or more of the student assessments to a grader. This means that a grader or assessor can be presented with one or more assessee responses to the same question such that the grader may grade one or more of those responses repeatedly.

A reporting component can generate one or more reports in relation to one or more of the assessments. A report can be generated to compare students based on a cross section of categories, such as school district, zip code, grade, state, etc. One or more of the reports generated by the reporting component can be based on standards or related resources. For example, a report can have narratives explaining one or more strengths a student has or one or more weaknesses the student may have. In this way, students can be grouped, tested, taught, etc. accordingly.

The following description and annexed drawings set forth certain illustrative aspects and implementations. These are indicative of but a few of the various ways in which one or more aspects are employed. Other aspects, advantages, or novel features of the disclosure will become apparent from the following detailed description when considered in conjunction with the annexed drawings.

DESCRIPTION OF THE DRAWINGS

Aspects of the disclosure are understood from the following detailed description when read with the accompanying drawings. Elements, structures, etc. of the drawings may not necessarily be drawn to scale. Accordingly, the dimensions of the same may be arbitrarily increased or reduced for clarity of discussion, for example.

DETAILED DESCRIPTION

Figure 1:
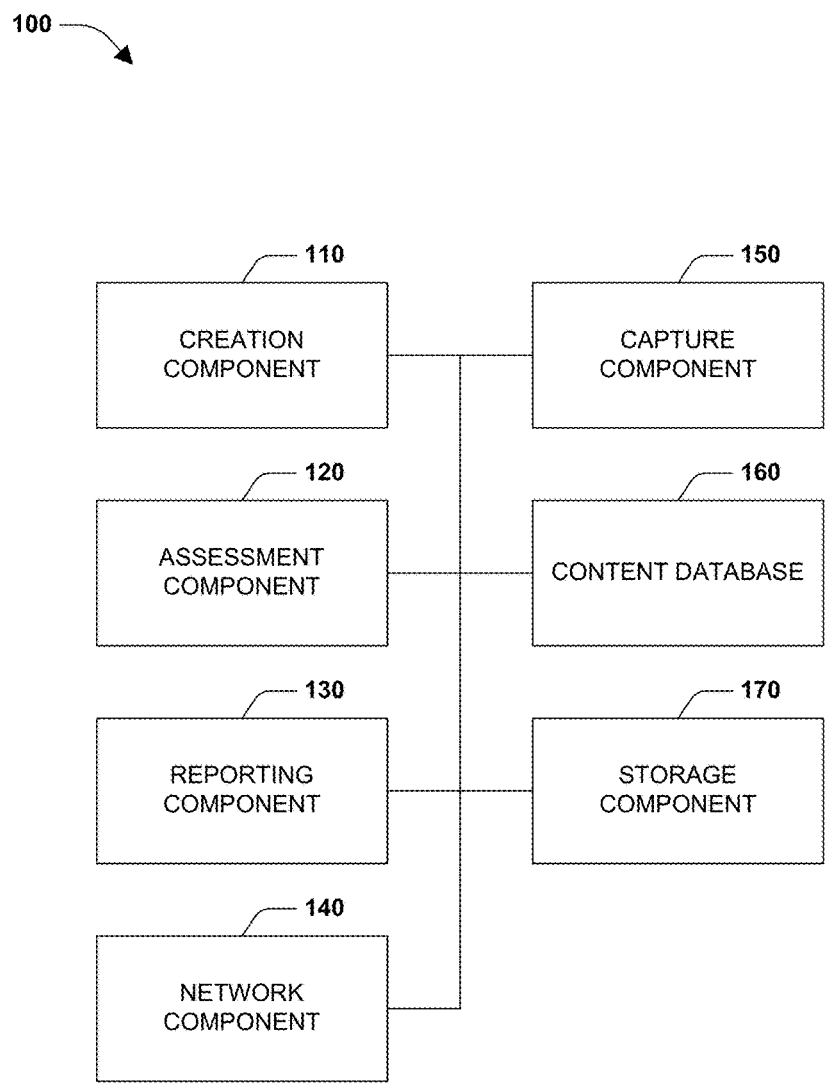
FIG. 1 is an illustration of an example system for curriculum assessment, according to one or more embodiments.

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

Figure 12:
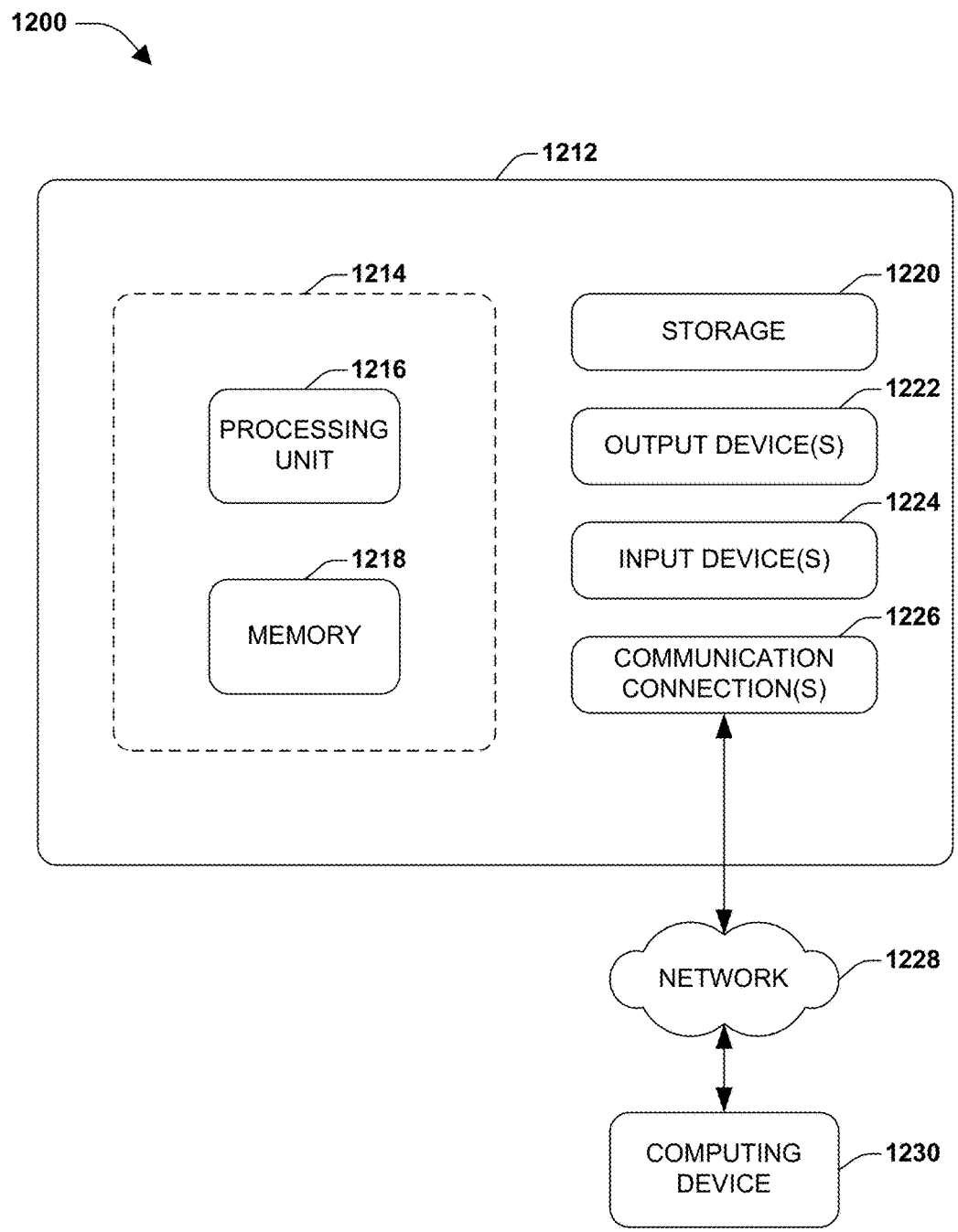
FIG. 12 is an illustration of an example computing environment where one or more of the provisions set forth herein are implemented, according to one or more embodiments.

For one or more of the figures herein, one or more boundaries, such as boundary 1214 of FIG. 12, for example, are drawn with different heights, widths, perimeters, aspect ratios, shapes, etc. relative to one another merely for illustrative purposes, and are not necessarily drawn to scale. For example, because dashed or dotted lines are used to represent different boundaries, if the dashed and dotted lines were drawn on top of one another they would not be distinguishable in the figures, and thus are drawn with different dimensions or slightly apart from one another, in one or more of the figures, so that they are distinguishable from one another. As another example, where a boundary is associated with an irregular shape, the boundary, such as a box drawn with a dashed line, dotted lined, etc., does not necessarily encompass an entire component in one or more instances. Conversely, a drawn box does not necessarily encompass merely an associated component, in one or more instances, but can encompass a portion of one or more other components as well.

Assessing student performance, whether in public grade schools or advanced certification courses can prove very burdensome or more to teachers and graders, despite the fact that many assessments may be identical at least in part for one or more test takers or students, and other means of assessment such as essays, design projects or code files still contain commonalities lending themselves to automated analysis. Substantial effort is required to standardize material between educational entities, and additional personnel hours are devoted to analyzing the statistics underlying performance between test takers locally and across a standardized region. Accordingly, one or more systems or methods for curriculum assessment are provided herein. An assessment (e.g., as provided by the disclosure herein) can provide an assessor (e.g., educators, supervisors, administrators, licensors) a method to create, generate, print, administer, score and analyze assessments based on the curriculum.

FIG. 1 is an illustration of an example system 100 for curriculum assessment, according to one or more embodiments. One or more systems and methods to create, generate, score, grade, or analyze assessments based on, for example, a curriculum are disclosed herein. The system 100 can include a creation component 110, an assessment component 120, a reporting component 130, a network component 140, a capture component 150, a content database 160, and a storage component 170. One or more of these components can exist within a device, or can be executed locally or remotely by a user (e.g., assessor, instructor, educator, supervisor, administrator, and licensor) device (e.g., desktop computer, notebook computer, tablet, handheld or mobile device, personal digital assistant, and cellular phone). The components can be collocated in a single module or associated modules, or can exist remotely from one another on distinct devices or locations.

In one or more embodiments, the creation component 110 can be configured to generate or create one or more assessments. An assessment can include one or more types of questions, such as multiple choice, short answer, fill in the blank, matching, essay, etc. The content database 160 can house or store these questions and facilitate creation of one or more of the assessments. For example, the content database 160 can store these questions and corresponding metadata or assessment parameters, such as a difficulty level of a question, a curriculum topic, subject, grade level, textbook, chapter, etc. associated therewith. This enables assessors (e.g., faculty, administrators, teachers, professors, graders, educators, supervisors, licensors, etc.) to build or create an assessment with little effort. The creation component 110 can be configured to determine or create one or more distractors associated with one or more questions. For example, if a question is 8*2=?, a distractor can include '10' or '6', because 8+2=10 and 8−2=6. In this way, the creation component 110 can be configured to create questions that help students overcome misconceptions. Stated another way, the creation component 110 can be configured to generate one or more distractors that are associated with an anticipated train of thought for a student which may be incorrect, for example.

For example, an educator can provide one or more parameters for the creation component 110 and receive one or more assessments in response. In one or more embodiments, the creation component 110 can create an assessment when an educator inputs one or more assessment parameters, such as a grade level, a textbook, a chapter, or a subject, by drawing from one or more questions of a question bank, question database, or the content database 160. That is, an educator could select a textbook, textbook edition, a chapter, and a difficulty level and the creation component 110 could generate one or more assessments in accordance with these assessment parameters. In this way, one or more flexible assessments may be generated.

The creation component 110 facilitates creation of a form that can be used in, for example, an assessment or a test. Formatting of the form can be customized based on assessment parameters, such as a users' individual preferences, a standardized methodology (e.g., curriculum, subject, requirement), or any combination thereof. That is, one or more of the questions of the assessment can include standardized content. Formatting can include a number of questions instructions related to inputs, a number of answers or inputs, and the way questions and answers are numbered. In one or more embodiments, the number of questions and answers are not equal. One or more embodiments can include a variety of question or input types, including exclusive multiple choice (e.g., select one from a group, true/false, and so forth), non-exclusive multiple choice (e.g., select several from a group), sentence (e.g., one line), short answer (e.g., a specified number of lines), extended response (e.g., an unspecified number of lines), single-page essay (e.g., one page to answer), multipage essay (e.g., a specified number of pages to answer), figure or diagram (e.g., anywhere on the page, in a predetermined area, in alignment with a grid or other geometric bases), and others. In one or more embodiments, answers such as essays or figures can have additional constraints imposed in terms of layout and organization based on a user preference or a curriculum. The form can also include instructional or supplemental text or diagrams, such as (but not limited to any of) an indicator to stop after a particular portion, skip a portion, or refer to another portion or document.

In one or more embodiments, the creation component 110 may generate different assessments for different students in a class for a curriculum based on assessment parameters. In other words, based on different assessment parameters, the order of the questions may be different among students, students may have different questions, students may have a different number of questions, students may have different types of questions on an assessment for a curriculum, etc. Stated yet another way, questions may be randomized. That is, an assessment or form can be tailored for multiple uses (e.g., the same form given to a plurality of entities completing the form), permitting an individual use to facilitate a variety of idiosyncratic inputs. In one or more embodiments, the creation component 110 can generate different assessments for different students based on one or more weaknesses of a student or one or more strengths of a student. That is, a first student taking an exam or an assessment may have a different exam or assessment than a second student taking an exam or assessment on the same subject, assignment, curriculum, etc. For example, the first student may have a first exam focused on weaknesses of the first student, while the second student may have a second exam focused on weaknesses of the second student. In this way, students may be provided education that is individualized, tailored, or customized to their needs, for example.

Assessors or educators can create answer keys related to many question types including multiple choice, short answer, sentence, extended response, essay, and instructive text. In one or more embodiments, these answer keys can be stored in the content database 160 or the storage component 170. Accordingly, assessments can be customized to include very specific formats and subject matter based on an assessor's interests. Additionally or alternatively, standardized testing such as state and national benchmark testing, formative assessment in the classroom and annual certification tests can be accomplished via this technique. Multiple question types can be combined into a single format to completely match, for example, a curriculum (e.g., including desired delivery and assessment methods).

In one or more embodiments, the content database 160 can house or store one or more assessments which were previously created. This means that an educator can access an archive of one or more old exams or 'old' assessments for current or future use. Additionally, the creation component 110 can be configured to upload, save, or transmit one or more assessments to the content database 160 for future use.

An educator may select one or more assessments, one or more portions of one or more assessments, or one or more questions to be saved, uploaded to, or stored on the content database 160. Similarly, an educator may select one or more of the assessments, one or more portions of one or more of the assessments, or one or more questions to be downloaded, incorporated, or used as a portion of an assessment being created by the creation component 110.

A variety of embodiments for such forms or assessments can be designed for one or more applications or classes by creating different combinations of questions, a number of questions, formatting assessments according to one or more arrangements (e.g., having a first input area arranged before a second input area in a first assessment and having the second input area arranged before the first input area in a second assessment), etc. For example, if the content database has multiple choice questions that take one minute apiece, and essay questions that take five minutes apiece, a first student may have a first assessment with thirty multiple choice questions and six essay questions, while a second student may have a second assessment with seven essay questions and twenty five multiple choice questions for that assessment topic, curriculum, etc.

The creation component 110 can receive a variance input indicative of how much variety an assessment for a curriculum may have. That is, it may not be desirable for an assessment to be entirely multiple choice questions for one student and entirely essay questions for another student. Accordingly, the creation component 110 can temper or adjust assessments within a tolerance range based on the variance. This means that the creation component 110 can adjust a composition, content, length, etc. of an assessment based on educator input.

An assessment can have one or more input areas (e.g., areas for a student to answer a question, such as a blank or one or more selections). In other words, an input area can be an area provided within an assessment for a student to respond to a question. An assessment can include one or more input areas, such as an area that can be "filled out". That is, physical assessments may be completed by hand, using pencil, pen, etc., while electronic assessments may be typed, etc. In one or more embodiments, a physical copy of an assessment may be provided to students and an electronic image scanned or captured for curriculum assessment. Additionally, inputs or input areas to forms or assessments can be configured to enable storage (e.g., as text or images in a recognized format) or analysis, such as searching, comparison, marking, supplementing, summarizing, reporting, etc. In one or more embodiments, input areas or assessments can be submitted electronically for recognition or analysis, and results of the recognition and analysis can be reported in whole or aggregated, analyzed, and presented or transmitted electronically.

Additionally, an assessment can include a student identification (student ID) field, an assessment name, an assessment topic, an assessment chapter, associated text, score, date, directions, instructional text, page numbers, etc. In one or more embodiments, an assessment can have an identifier, such as a bar code, quick response (QR) code, serial number, document number, Universal Product Code (UPC), other code, etc. The identifier can be used to determine one or more aspects related to an assessment or embed associated information, such as which questions are on the assessment, the order of the questions, the type of questions, the number of questions or the subject, curriculum, topic, textbook, textbook edition, class, teacher, school district, assignment, student, other metadata, etc. associated with that assessment.

Effectively, the identifier can include metadata used to identify an exam or assessment (e.g., or aspects thereof), thereby enabling tracking and reporting of assessments, portions of assessments, or even specific questions within an assessment.

In one or more embodiments, an assessment can be linked to remote content (e.g., streaming content such as audio or video) to supplement their administration. For example, a test or an assessment can include video prompts or others when forms are administered either via electronic means (e.g., test filled out on a computer, tablet, educational device or mobile device) or in conjunction with electronic means (e.g., test filled out manually but linked to television, monitor, computer, audio player or other device capable of retrieving content).

The creation component 110 can be configured to create one or more registration marks on an assessment. These registration marks can be captured or identified by the capture component 150 to determine an orientation of an assessment for grading, for example. In other words, one or more registration marks can be used to facilitate capturing of one or more assessee responses after the student has taken an assessment or an exam by enabling the capture component 150 to determine which side of an image is 'up' and which side is 'down'. This means that the registration marks enable the assessment component 120 to align an assessment similarly to an answer key for grading (e.g., by using image comparison between an assessment and the answer key).

In one or more embodiments, an identifier of an assessment can be generated independently from the assessment. For example, an identifier can be a sticker that a student or an educator places on or affixes to an assessment. An assessment can be administered by an educator in a traditional fashion, such as by hand, or electronically. For example, an assessment can be administered on a desktop computer, a laptop, a mobile device, a tablet, etc. The network component 140 may be configured to administer one or more assessments to one or more students electronically. For example, the network component can be configured to administer one or more of the assessments by web or across a network, etc.

For example, the network component 140 can be communicatively coupled to one or more devices that administer one or more of the assessments to one or more test takers or students. Here, the network component 140 can effectively aggregate results or assessee responses from one or more of the assessments. The network component 140 can deliver these results to the storage component 170 or the assessment component 120. That is, once an assessment is taken, or form input and other associated information is provided, the period to provide information related to a form can be closed or completed. Thereafter, the forms (and all associated data) can be aggregated or submitted, locally or remotely, to the assessment component. In embodiments, forms are scanned and submitted electronically to the assessment component. In one or more embodiments, the submission can occur via the network component 140 (e.g., upload, email, transfer, etc.). In one or more embodiments, the submission can occur locally. Combinations are also possible.

According to one or more aspects, systems and methods are provided to capture one or more assessment images of one or more students or test takers, thereby enabling review and scoring of one or more assessee responses electronically. In one or more embodiments, some students may take an assessment traditionally, such as on paper, while other students may take a corresponding or similar assessment electronically. In this scenario, the capture component 150 can capture one or more assessee responses for the traditional assessments (e.g., via a camera on a mobile device, via a scanner, etc.) and store one or more of the assessee responses on the storage component 170, while the network component 140 can aggregate assessee responses for electronic versions of the assessment and deliver these assessee responses to the storage component. In this way, an assessment may be administered physically, electronically, or any combination thereof.

As an example, a foreign language teacher can give a written exam to a local class including both multiple choice and short answer portions. At the end of the test period, tests or assessments can be collected. The teacher can scan these tests into one or more files or assessment images. These files (e.g. assessment images) can be processed, locally or remotely, upon submission to the assessment component 120. In one or more embodiments, one or more processing can occur independent from (e.g., before or after action by) the assessment component 120. For example, the teacher can run text recognition locally to facilitate concurrent action or other desired ends before submitting the files to the assessment component 120. Once the files are submitted to the assessment component 120, the assessment component 120 processes the files and grades the tests. In one or more embodiments, the teacher can also include a spoken portion of the foreign language exam. Recorded files of the students speaking can also be submitted to the assessment component for processing and grading. Once the exams are processed and assessed, the results can be provided to the reporting component 130. In one or more embodiments, other file types may be utilized or uploaded by students for evaluation, such as text documents, image files, video files, PowerPoint, etc.

In one or more embodiments, captured images or assessment images relating to students, test taker, assessee, etc. or their work (e.g., assessee responses) can be viewed, manipulated, and evaluated on a variety of devices employing a plurality of different protocols and standards. In one or more embodiments, various desktop or notebook computers, mobile or tablet devices and other systems can be used to access and utilize assessment images or assessee responses, etc. In one or more embodiments, applications can be employed on the devices; in other embodiments, native device capabilities are leveraged. In one or more embodiments, the images can utilize a proprietary standard that allows additional information to be associated with scanned or captured assessee work or assessee responses, etc. In other embodiments, existing standards (e.g., Portable Document Format (PDF), layered Paint Shop Pro™ files, etc.) can be utilized. A user can perform manual or automatic grading using the captured images and their device, or combinations thereof. In one or more embodiments, the user can "mark-up" or otherwise add additional content to the images, which can be stored locally or remotely. In one or more embodiments, a student, test taker, assessee, etc. can view a captured assessment image for their assessment before or after grading and modification. Other possibilities for viewing, grading, manipulation, and reporting-out the details of captured work images will be appreciated in view of the details herein.

In one or more embodiments, the capture component 150 or the assessment component 120 can be configured for optical mark recognition (OMR) or optical character recognition (OCR). This enables the assessment component 120 to present text to a grader when some students are administered a physical copy of an assessment and other students or test takers are administered an assessment electronically.

Additionally, OCR and OMR may mitigate storage space utilized on the storage component 170.

The creation component 110 can be configured to generate one or more physical copies of an assessment or one or more digital copies of the assessment. Physical assessments can be printed on paper. The creation component 110 can also facilitate distribution of the forms or assessments. The forms can be distributed electronically, either to a local assessee (e.g., student, applicant, licensee, worker, employee) set (e.g., classroom, facility, profession, organization) or remotely to permit each individual providing input to the forms when and where they are able (unless otherwise specified by the assessor). The forms can also be sent to a printer, or distributed to one or more assessors or other points of contact in a known document type to facilitate local printing or redistribution.

In one or more embodiments, an assessment can be captured using a capture component 150. The capture component 150 can be a scanner, copier, camera, or another image capture device. In one or more embodiments, the capture component 150 can have an audio component (not shown) that records one or more sounds, such as a spoken or verbal portion of an exam or assessment, for example. In other words, the capture component 150 can receive, capture, or record one or more assessee responses for an assessment. For example, once created and distributed, the forms can be filled out in a variety of ways, including handwriting, typing, drawing (e.g., by hand or with a device), speaking, gesturing, communicating, etc. In one or more embodiments, additional data can be recorded (e.g., audio, video) and stored for consideration with a form or as an input or response to a prompt related to a form. Further, other files may be incorporated into an assessment or responses associated with an assessment. For example, a reference document, such as a periodic table may be included as an attachment in a chemistry exam or assessment. The attachment may be an image file, a text file, a word document, a PowerPoint document, an Excel file, etc. In one or more embodiments, an application may be included with the assessment. This means that a student can run an 'app' during the assessment. For example, the student may be provided with a calculator app during a mathematics assessment. One or more functions of an app may be enabled or disabled by an instructor. For example, symbolic integration may be disabled on a calculator application for students in a calculus class.

Similarly, a student or assessee response can include one or more files, such as a text file, an image file, video file, an audio clip, Word document, PowerPoint, Excel spreadsheet, etc. This enables students or test takers to respond using a variety of formats. For example, a student in a sign language class can record a video clip of a response to a question in sign language. The video clip can be associated with an assessee response and uploaded for review, for example.

In one or more embodiments, one or more of the assessee responses can be stored on a storage component 170. That is, the storage component 170 can be configured to aggregate one or more of the assessee responses. If a test or an assessment is administered electronically, the network component 140 can deliver one or more of the assessee responses to the storage component 170. One or more of the assessee responses can be an image of an assessment with answers in one or more of the input areas of the assessment. As an example, the capture component 150 can be a mobile device that captures one or more assessment images from one or more of the assessments. As another example, the capture component 150 can be a scanner configured to scan one or more assessment images from one or more of the assessments.

The assessment component 120 can be configured to grade, process, or assess one or more portions or one or more questions of an assessment. For example, the assessment component 120 can grade true/false or multiple choice questions of an assessment by identifying an assessment based on an identifier to determine which questions are on the assessment. That is, the capture component 150 can capture the identifier for an assessment and determine a topic, a curriculum, questions for an assessment, an associated textbook, locate a corresponding answer key, etc. Additionally, one or more of the alignment marks can be used to orient an assessment with the answer key for comparison.

Processing of form inputs, assessments, or assessee responses associated therewith can take a variety of forms. In one or more embodiments, no processing is necessary, as the forms are completed electronically in known formats already prepared for assessment (e.g., grading, comparison to a master form, summarization, and others). In one or more embodiments, forms are submitted in formats that require processing to recognize content for assessment.

Processing can include, but is not limited to, various techniques for character or mark recognition, such as optical character recognition, intelligent character recognition, optical mark recognition, handwriting recognition, code reading, etc. In addition, images can be captured or located on the form, and image recognition techniques can be employed to facilitate recognition or comparison of images to be considered in grading. In one or more embodiments, various computer vision and/or language technology techniques can be employed to recognize images or other inputs such as sound or video. Technologies such as pattern matching or recognition, segmentation, classification, regressions, sequence labeling, parsing, clustering, and other machine learning or artificial intelligence techniques for identifying and evaluating images can be employed with images or video. Voice, tone, and gesture recognition can be employed to identify and evaluate video and audio. In one or more embodiments, enhancement or restoration of text, images, video or audio can be performed before, during or after processing, to facilitate easier recognition by the assessment component or a user.

The technologies can also provide a plain text transcription of the content, or describing the content, in conjunction with the processing. For example, if a right triangle is drawn as an input (e.g., an assessee response), an output may be provided indicating that a right triangle was drawn. In more complex embodiments, verbal language can be recognized from an audio clip, or sign language can be recognized from a video, and the words spoken or signed can be transcribed. In still a more specific example, a music test may require a test taker to play back music. The audio can be compared to a "key" audio file, and anomalies annotated, or the audio can be processed and output as sheet music of what was actually submitted for comparison against sheet music of the requested or expected music.

The capture component 150 or the assessment component 120 can align an assessment using one or more registration marks on an assessment image captured by the capture component 150. This enables the assessment component 120 to determine an orientation for the assessment and compare one or more portions of the assessment to an answer key. Additionally, the assessment component 120 may utilize one or more of the alignment marks to determine which input areas of an assessment contain handwriting. These alignment marks in conjunction with the identifier enables the assessment component 120 to determine which assessee responses can be compared with an answer key and which assessee responses should be segmented and presented to a grader. In one or more embodiments, the capture component 150 or the assessment component 120 can be configured to perform random sample consensus (RANSAC) to determine alignment in relation to one or more of the registration marks.

In one or more embodiments, one or more portions of the form or assessment can be aligned, automatically or manually, with standards promulgated by an entity (e.g., educational, commercial, industrial). Standardized content can be added (e.g., with existing files, removable media, manually, and otherwise) and integrated automatically with the forms. In one or more embodiments, databases facilitating standardization can be invoked in form creation and/or compared after the form is created to ensure compliance. In this fashion, standards such as educational benchmarks (e.g., federal, state, other), licensing requirements, certification or recertification materials, and others can be integrated into custom tests while ensuring compliance. In one or more embodiments, wholly standardized tests can be used in accordance with techniques described herein, permitting faster processing and analysis even where the creation component is largely or wholly bypassed or unused.

Additionally, the assessment component 120 can be configured to segment one or more portions of an assessment or one or more of the assessee responses to one or more of the questions of the assessment and present one or more of these segments to an educator or a grader. As an example, if a class has ten students, ten different assessments may be generated by the creation component 110 for a curriculum, topic, subject, chapter, etc. One or more of these ten assessments may have questions in common, such as an essay question. Here, the assessment component can segment one or more corresponding assessee responses for a question in common with one or more of the assessments and present these segmented assessee responses to a grader or an educator for grading. In this way, a grader can grade multiple responses to the same question on a repetitive basis, thereby enabling him or her to efficiently grade questions or assessments quickly. In other words, because the assessment component 120 aggregates assessee responses to a shared or common question and presents these assessee responses sequentially to a grader, the grader can quickly or efficiently grade the question (e.g., similar to mass production).

Because assessee responses are aggregated and presented to a grader en masse, the grader can be in a mindset for grading a particular question. Additionally, the grader may be less likely to exhibit bias while grading the assessee responses, as the assessment component 120 may be configured to mask student information from the grader during the grading process.

As another example, if a grader or an educator has a spoken portion of an assessment, the capture component 150 can capture an audio clip associated with the spoken or verbal portion of the assessment and store one or more of the audio clips on the storage component 170. When an assessor, grader, educator, etc. is grading the assessment or the portion of the assessment associated with the spoken portion, the assessment component 120 can present or playback one or more of the audio clips for the grader to evaluate. The assessment component 120 can be configured to receive one or more scores corresponding to one or more of the audio clips for the spoken portion of the exam or the assessment.

The assessment component 120 can be configured to incorporate scores from a grader, assessor, educator, etc. with scores assigned by the assessment component 120 (e.g., scores for true/false questions, scores for multiple choice questions, matching, etc.). The assessment component 120 can determine a score for a student or test taker. Stated another way, the assessment component 120 can determine a score for a student by automatically grading one or more portions of an assessment and receiving scores for segmented portions of an assessment (e.g., essay questions, verbal or spoken portions of an exam, etc.). The assessment component 120 can weigh these scores accordingly to an answer key and calculate or determine a final score for an assessment.

The assessment component 120 can store or aggregate forms or assessments and inputs (e.g., assessee responses) before and after processing (e.g., OCR, OMR, grading, etc.). In one or more embodiments, the forms as-submitted are stored to permit inspection of an original in the case of misrecognition or corruption of one or more forms. In one or more embodiments, the forms are stored after processing to provide prompt availability of forms that are graded or are ready for grading. In other embodiments, forms are saved in one or more locations or memories in multiple versions, storing both the original and processed.

In one or more embodiments, the assessment component 120 marks the forms (e.g., marks correct or incorrect, updates to correct information, and so forth). In one or more embodiments, the marks can be toggled visible and invisible. In one or more embodiments, the marks can be stored in a separate metadata file applied to one or more particular forms and their inputs. In one or more embodiments, the assessment component 120 can provide preliminary scores that require validation or confirmation by an assessor or administrator. In one or more embodiments, portions of a form are left un-assessed for an assessor or administrator to address independently. In one or more embodiments, the assessment component 120 can include a quick response (QR) code reader, barcode reader, serial or document number database, or other readers that allow codes on the form to be linked to additional information, or facilitate the extraction of additional information from such codes.

In one or more embodiments, the network component 140 may be configured to implement one or more security measures during administration of an assessment. For example, the network component can interface with the capture component 150 or another image capture component (e.g., built in web camera on a laptop, etc.) and capture an image of a test taker or a student at a random point during the exam. This image may be associated with the assessment for cross reference, for example.

In one or more embodiments, one or more portions or inputs of an assessment or form can be filled using an electronic input. For example, a student password or biometric aspect can be entered to authenticate a form as being received from the student. Provisioning of the password or biometric aspect can auto-populate other fields or provide additional information related to the student, as well as the student's context while using the form (e.g., time, date, location, device or method of providing input, demographics). In one or more embodiments, a biometric feature can be physically marked onto the form (e.g., ink fingerprint). In one or more embodiments, the biometric feature can be captured electronically (e.g., fingerprint scanner, retinal scanner, facial recognition).

A reporting component 130 can generate one or more reports in relation to one or more of the assessments. A report can be generated to compare students based on a cross section of categories, such as school district, zip code, grade, state, etc. In still other aspects, data discerned from the assessments, as well as individual and aggregated responses thereto, can be used in various data analysis techniques. Reports can be generated to analyze assessment results down to one or more assessee responses for one or more questions of an assessment.

The reporting component 130 reports out the grading or comparison results to one or more entities (e.g., assessor, assessee) and stores and aggregates results in a fashion that enables easy access. In one or more embodiments, the reporting component 130 can aggregate results and perform various statistical techniques to provide analytics and analysis of the form results. For example, particular questions that were more often than not answered correctly or incorrectly on a test can indicate to an instructor portions requiring more or less instruction and emphasis. In other words, questions that may be answered with an extremely high success rate or failure rate (e.g., outliers) may be tracked and removed from the content database 160. Individual student metrics and comparisons between students can be generated to assist with understanding a class at varying levels of detail. These statistics can be aggregated over several terms or across multiple classes or institutions to provide a better picture of curriculum effectiveness and performance based on empirical evidence. Trends and leading/lagging indicators can be explored in high levels of detail.

In one or more embodiments, details from the reporting component 130 can be used to develop instructional strategies. For example, if a single question is repeatedly answered wrong in the same way, systems and methods can be employed to determine modifications to the educational program to properly teach the subject matter. In one or more embodiments, more complex statistics can be employed, evaluating multiple questions, multiple tests, or multiple classes and/or institutions. In this way, instructional strategies can be implemented to remediate areas where one or more students are lagging. Alternatively, where data or derived statistics indicate students have mastered the subject matter and require no remediation, instructional strategies designed to challenge students and push more rigorous instruction can be determined.

In one or more embodiments, the reporting component 130 can include a grade book that can facilitate the importing and exporting of grades, scores, and assessment information, as well as its integration or syncing with other applications or databases at varying levels of detail (e.g., by class, by student, by term, by curriculum, by instructor, etc.). Additionally, the reporting component 130 can be configured to provide narratives illustrating one or more strengths or one or more weaknesses of one or more students, test takers, assessees, etc. Further, the assessment component 120 can assess students or test takers based on one or more of the strengths or one or more of the weaknesses of one or more of the assessees, for example.

In one or more embodiments, the reporting component 130 communicatively couples with the network component 140 to provide device or remote access (e.g., web) at one or more permission levels. That is, students can be provided access to view their own grades. In one or more embodiments, teachers can view, but not edit, grades. In one or more embodiments, teachers can view or edit grades for one or more or all students. Other arrangements of permissions will be appreciated by those skilled in the art. The reporting component 130 can automatically push feedback to assessors, assesses, students, test takers, faculty, others involved in the process, etc. in one or more embodiments. In alternative or complementary embodiments, such feedback can be accessed on-demand.

Figure 2:
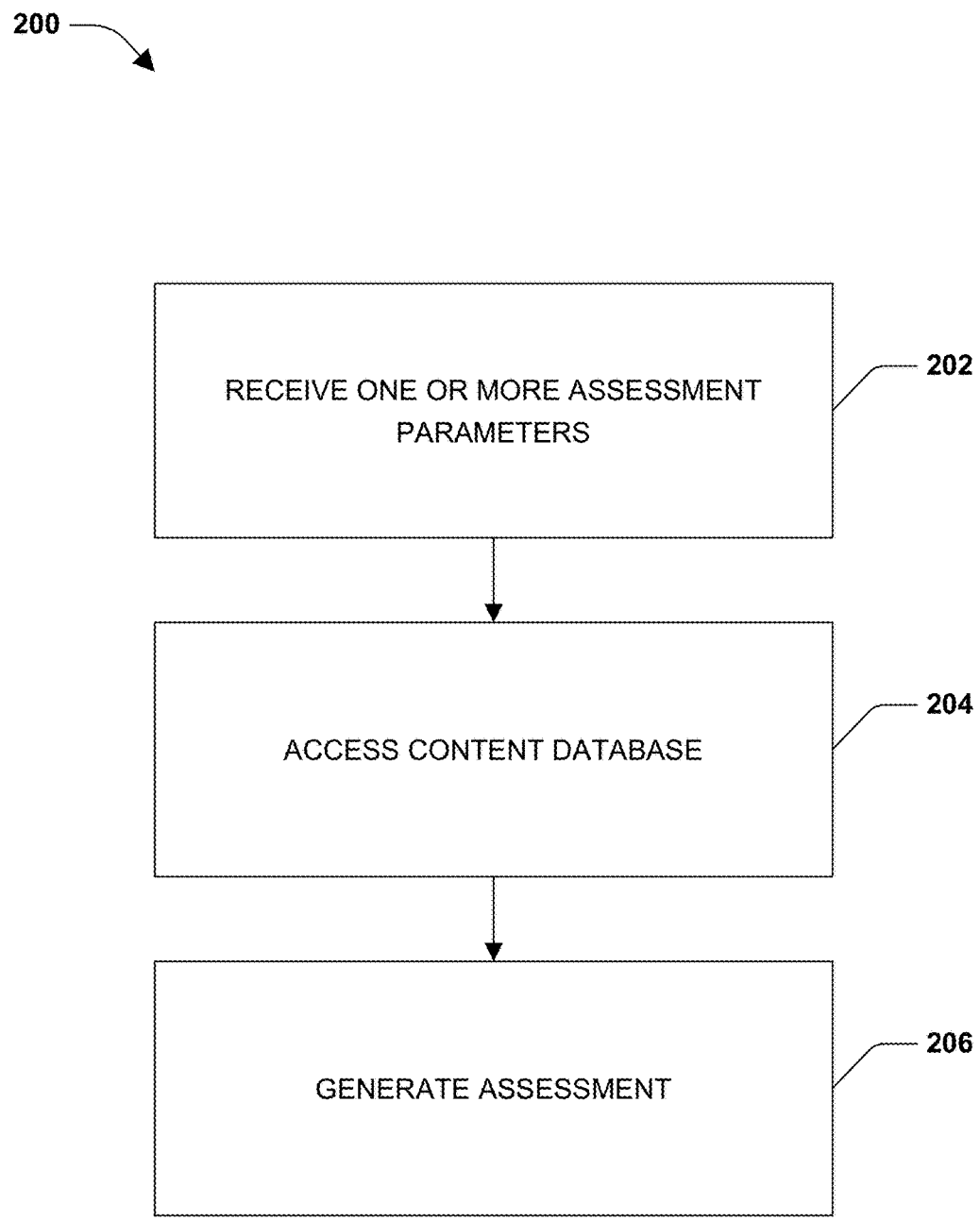
FIG. 2 is an illustration of an example flow diagram of a method for curriculum assessment, according to one or more embodiments.

FIG. 2 is an illustration of an example flow diagram of a method 200 for curriculum assessment, according to one or more embodiments. At 202, one or more assessment parameters can be received. For example, one or more of the assessment parameters can be indicative of a textbook, a chapter of the textbook, or a curriculum. Additionally, one or more formats may be selected for one or more questions of one or more assessments to be generated. At 204, a content database can be accessed to retrieve one or more questions in accordance with one or more of the assessment parameters. At 206, one or more assessments may be generated based on one or more of the assessment parameters and one or more of the selected formats.

Figure 3:
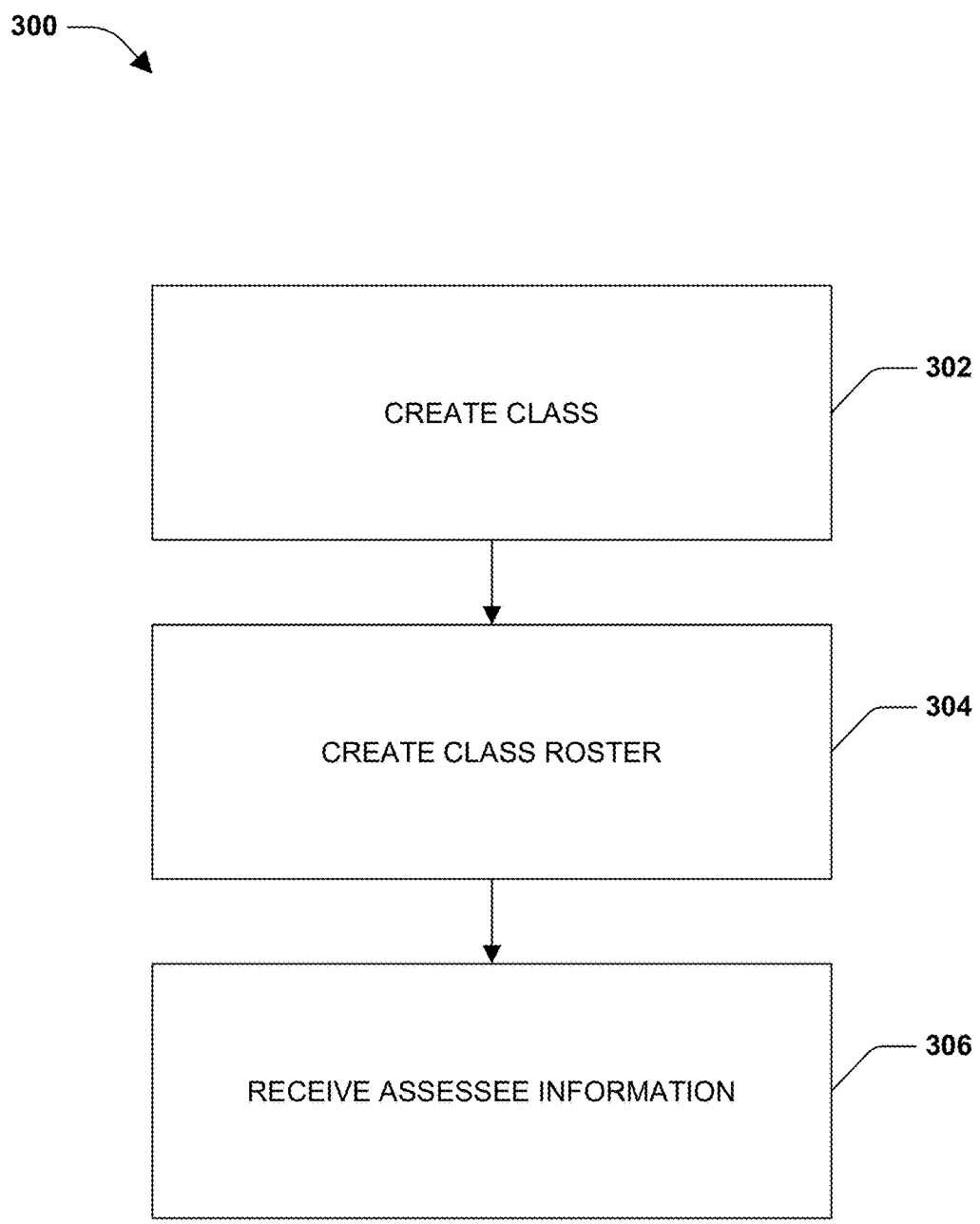
FIG. 3 is an illustration of an example flow diagram of a method for curriculum assessment, according to one or more embodiments.

FIG. 3 is an illustration of an example flow diagram of a method 300 for curriculum assessment, according to one or more embodiments. At 302, a class may be created. The class can include one or more students, test takers, or assesses. In one or more embodiments, the method 300 may be implemented via a creation component, a storage component, or a content database. At 304 a class roster can be created. At 306, assessee information can be received, such as a student identification code, school information, etc.

Figure 4:
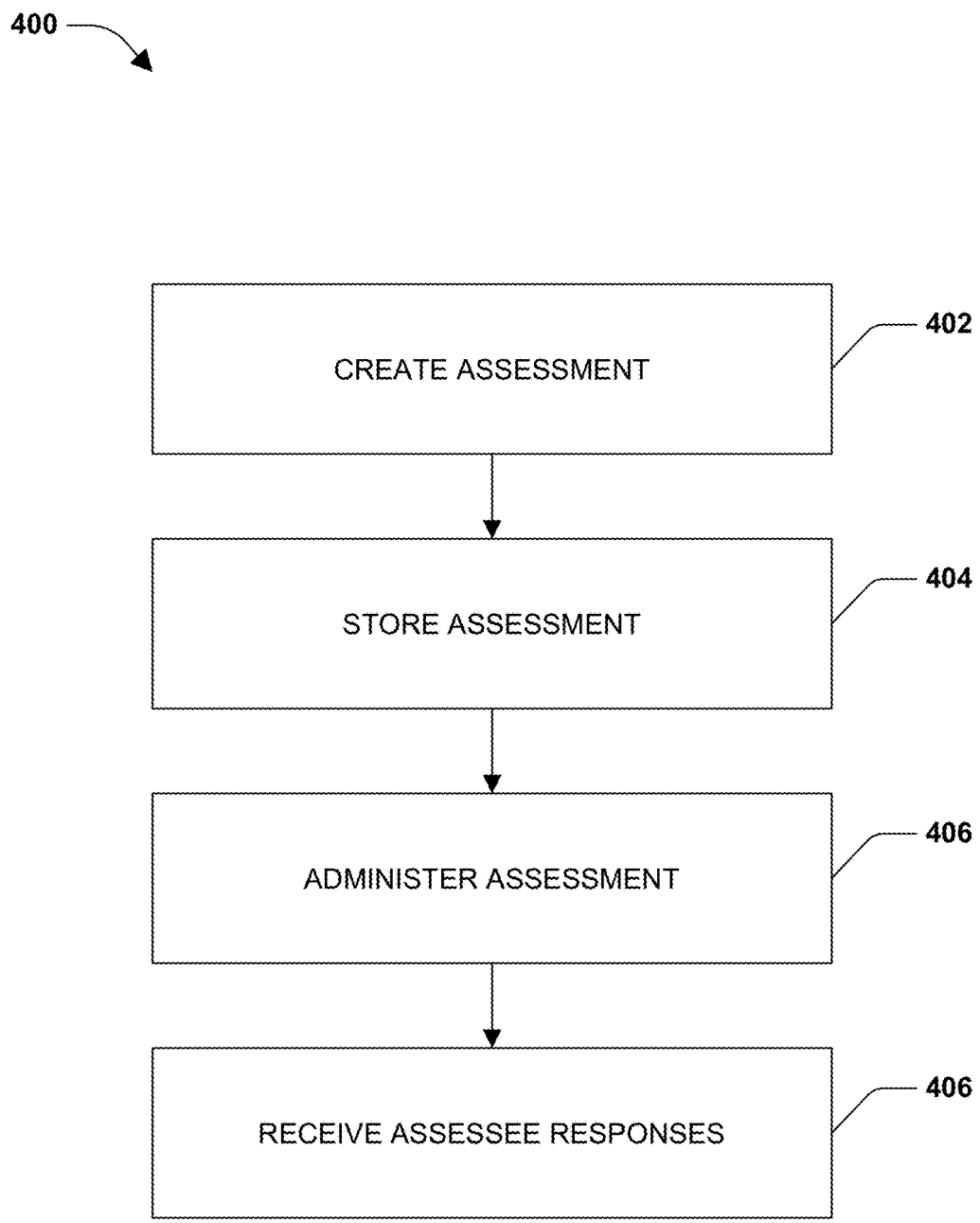
FIG. 4 is an illustration of an example flow diagram of a method for curriculum assessment, according to one or more embodiments.

FIG. 4 is an illustration of an example flow diagram of a method 400 for curriculum assessment, according to one or more embodiments. At 402, an assessment can be created. For example, an assessment can be created based on one or more assessment parameters. These assessment parameters can be selected by an educator or a test maker to customize content or a difficulty of the assessment being created. At 404 the assessment can be stored, such as in a storage component. At 406, the assessment can be administered. In one or more embodiments, one or more versions (e.g., with different questions, different numbers of questions, slightly different content, etc.) of an assessment may be created, stored, or administered. At 406, one or more assessee responses can be received. After assessee responses are received, these responses can be presented to a grader for grading in an efficient manner, as described herein. Assessee responses can include biometrics or security measures to confirm an identity of a test taker or assessee, for example. Security measures can include an image captured of a test taker during an assessment, a fingerprint, student identification number, etc.

Figure 5:
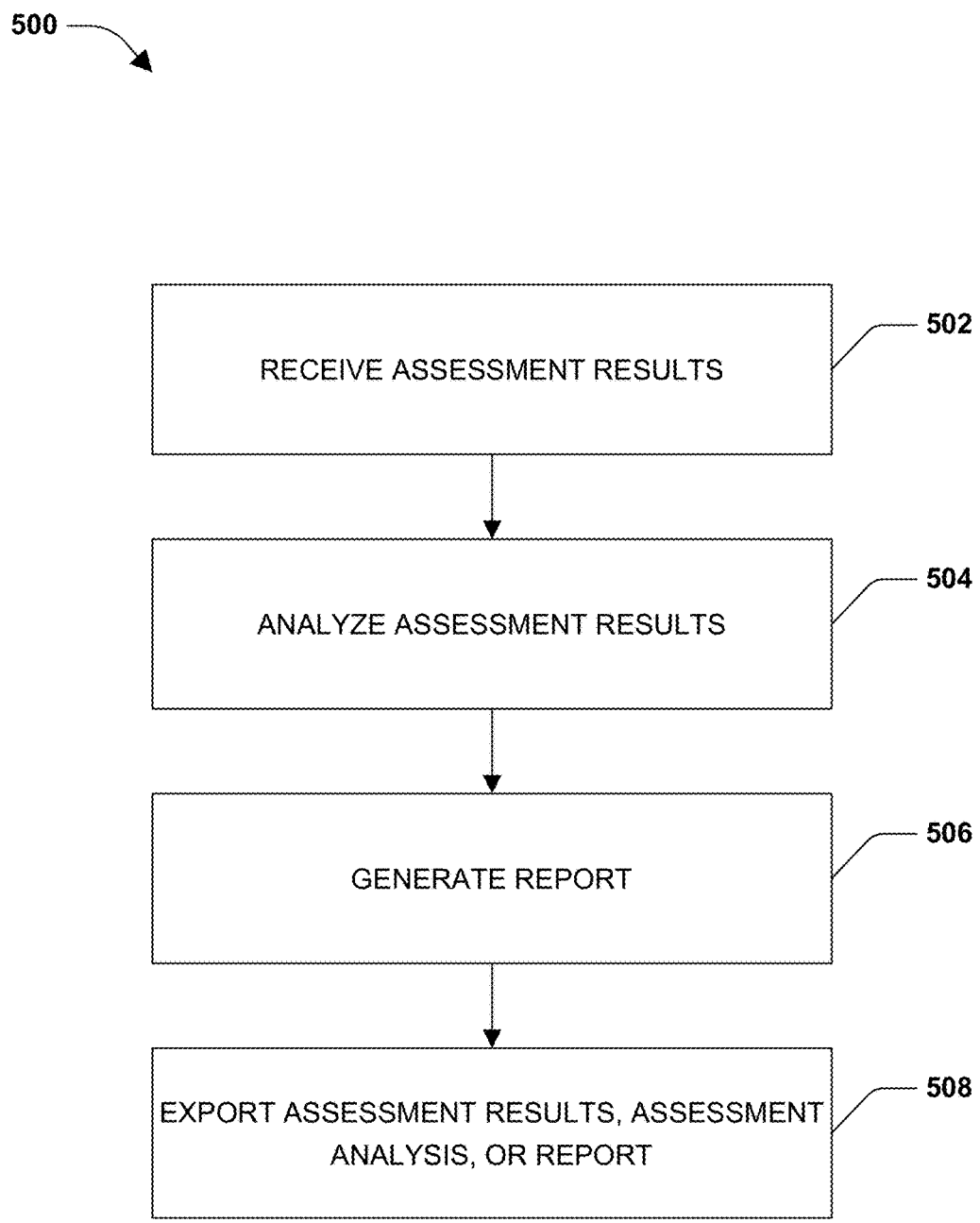
FIG. 5 is an illustration of an example flow diagram of a method for curriculum assessment, according to one or more embodiments.

FIG. 5 is an illustration of an example flow diagram of a method 500 for curriculum assessment, according to one or more embodiments. At 502, one or more assessment results can be received. Assessment results can include one or more assessee responses for one or more assessments. In other words, assessment results may include answers filled in by test takers or assessees. At 504, assessment results may be analyzed or graded, for example. At 506, one or more reports may be generated for one or more of the assessments. At 508, assessment results, assessment analysis, or one or more of the reports may be exported, such as to a spreadsheet file, for example.

Figure 6A:
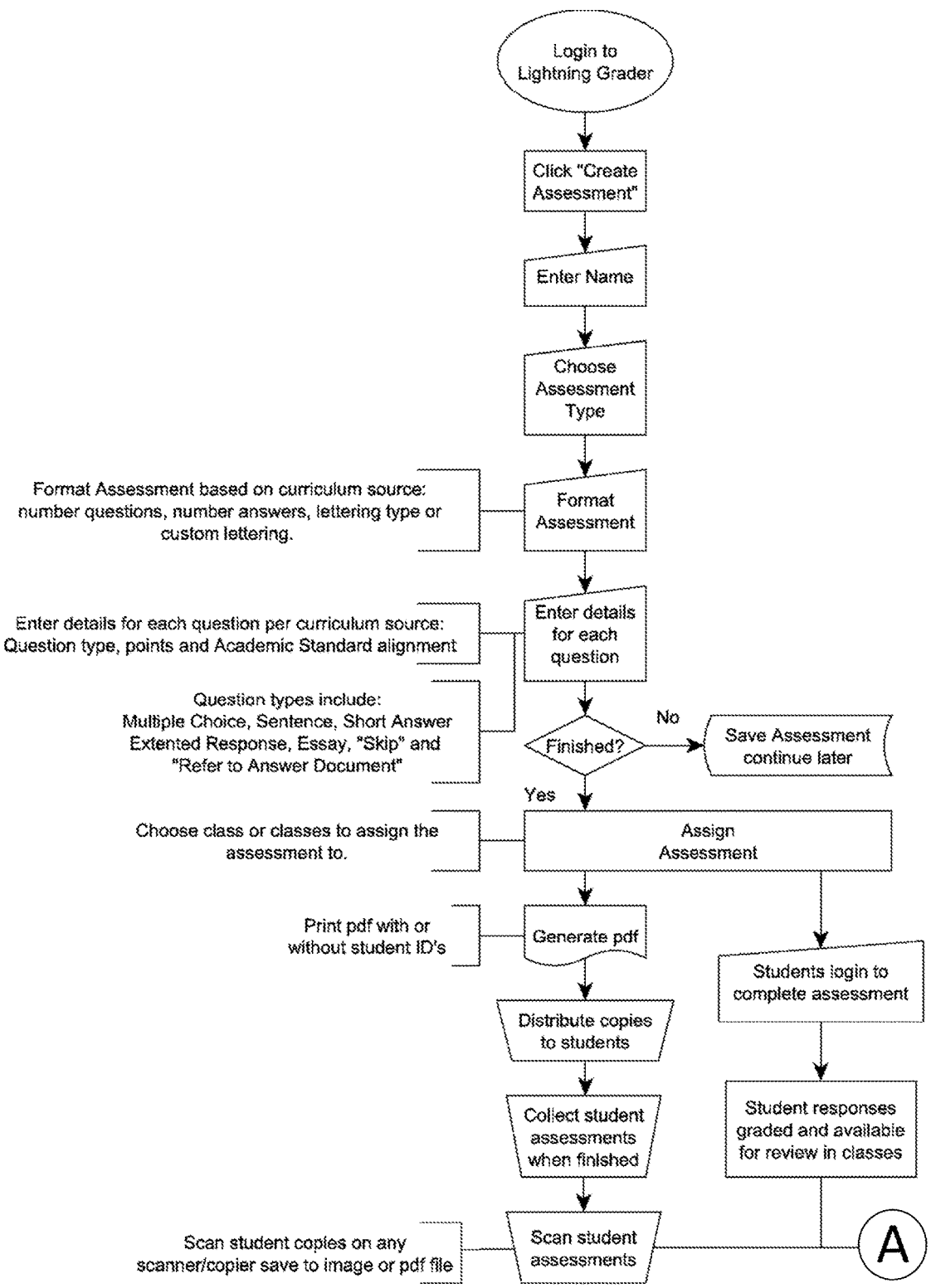
FIG. 6A and FIG. 6B are an illustration of an example flow diagram of a method for curriculum assessment, according to one or more embodiments.
Figure 6B:
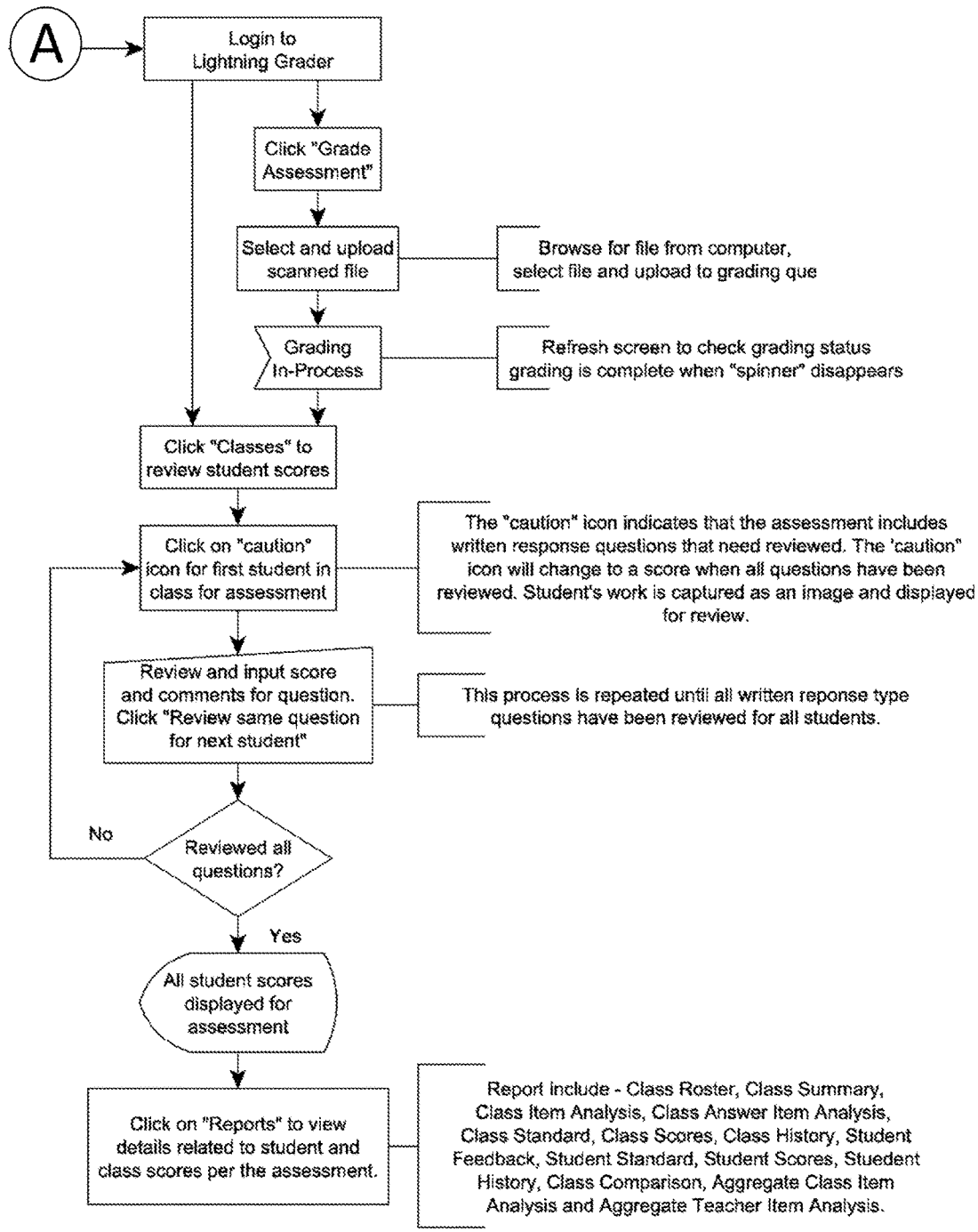
Figure 7:
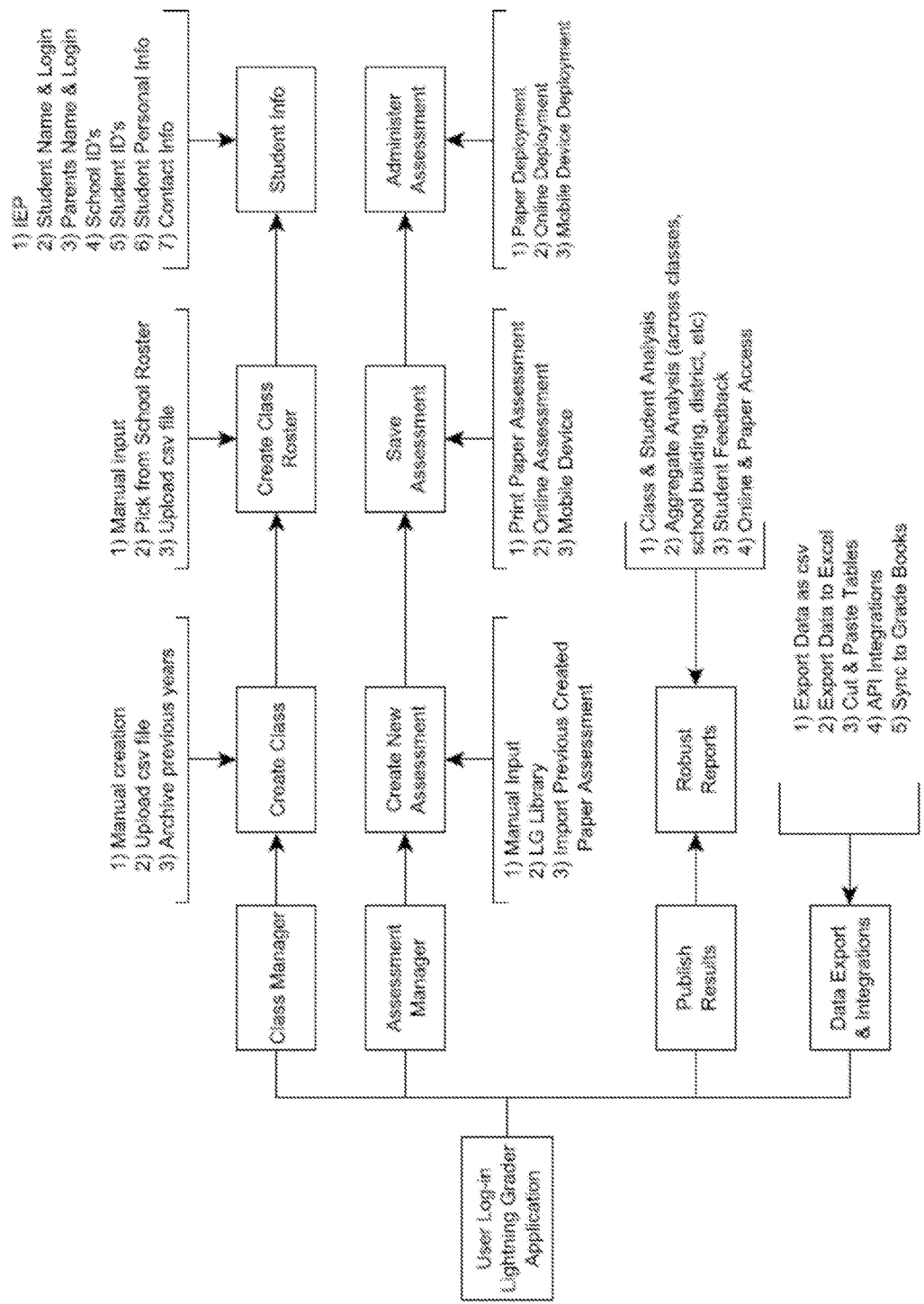
FIG. 7 is an illustration of an example flow diagram of a method for curriculum assessment, according to one or more embodiments.

FIG. 6A, FIG. 6B, and FIG. 7 are illustrations of example diagrams of implementations or methods 600 and 700 for curriculum assessment, according to one or more embodiments. The method 600 is a flow diagram that illustrates a process flow for creating, grading, and reporting an assessment. Similarly, 700 is a flow diagram that illustrates a process flow for creating, grading, and reporting an assessment.

Figure 8:
FIG. 8 is an illustration of an example curriculum assessment form, according to one or more embodiments.

FIG. 8 is an illustration of an example curriculum assessment form 800, according to one or more embodiments. The curriculum assessment form 800 of FIG. 8 has one or more types of assessment inputs and supplemental information (e.g., assessment information and a QR code). Included are, for example, a multiple choice selection allowing the "bubbling-in" of answers, a box for a single sentence, instructional text, and a box for a short answer. In one or more embodiments, the boxes are not shown on the actual assessment.

Figure 9:
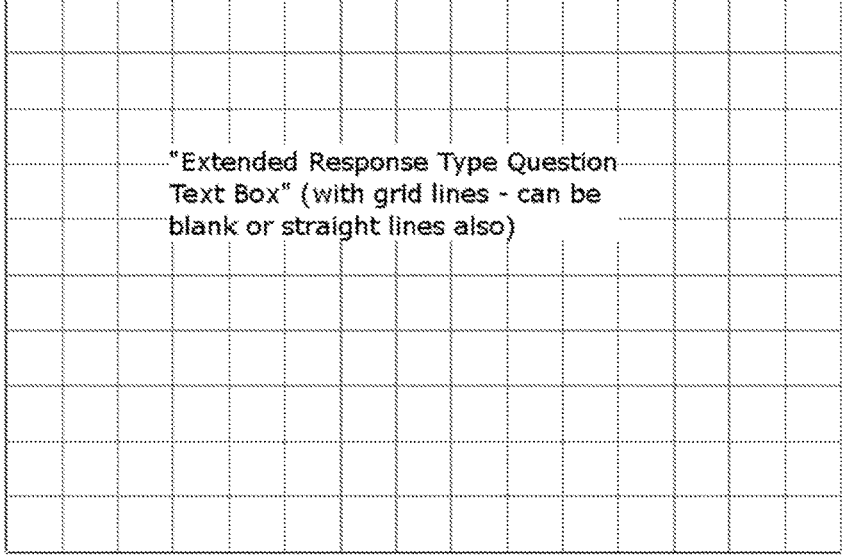
FIG. 9 is an illustration of an example curriculum assessment form, according to one or more embodiments.

FIG. 9 is an illustration of an example curriculum assessment form 900, according to one or more embodiments. The curriculum assessment form 900 of FIG. 9 has one or more types of assessment inputs and supplemental information (e.g., assessment information and a QR code). For example, the curriculum assessment form 900 has a gridded box allowing the input of text or drawings, prompting the assessee to abide certain scaling and geometric constraints and facilitating one or more commonalities between inputs without limiting possibilities or creativity.

Figure 10:
FIG. 10 is an illustration of an example curriculum assessment form, according to one or more embodiments.

FIG. 10 is an illustration of an example curriculum assessment form 1000, according to one or more embodiments. The curriculum assessment form 1000 of FIG. 10 has one or more types of assessment inputs and supplemental information (e.g., assessment information and a QR code) in accordance with one or more aspects described herein is shown. The curriculum assessment form 1000 has an essay-type text box. In one or more embodiments, multiple pages can be provided for longer essays. To facilitate printing and handwritten completion, such forms can be delivered or adapted for delivery via electronic means, permitting completion of the forms on a computer, tablet, educational device, etc.

Figure 11:
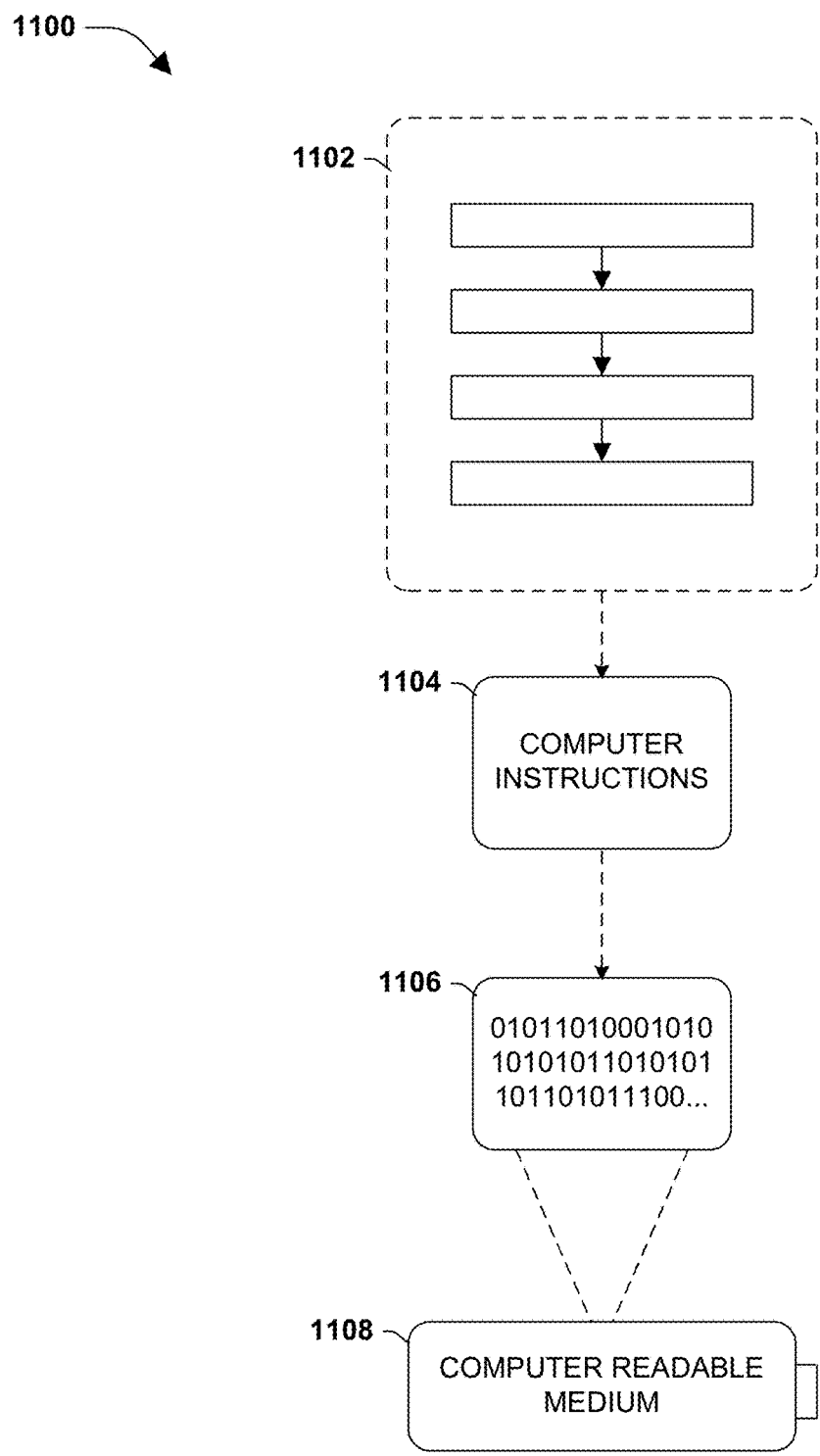
FIG. 11 is an illustration of an example computer-readable medium or computer-readable device including processor-executable instructions configured to embody one or more of the provisions set forth herein, according to one or more embodiments.

Still another embodiment involves a computer-readable medium including processor-executable instructions configured to implement one or more embodiments of the techniques presented herein. An embodiment of a computer-readable medium or a computer-readable device that is devised in these ways is illustrated in FIG. 11, wherein an implementation 1100 includes a computer-readable medium 1108, such as a CD-R, DVD-R, flash drive, a platter of a hard disk drive, etc., on which is encoded computer-readable data 1106. This computer-readable data 1106, such as binary data including a plurality of zero's and one's as shown in 1106, in turn includes a set of computer instructions 1104 configured to operate according to one or more of the principles set forth herein. In one such embodiment 1100, the processor-executable computer instructions 1104 are configured to perform a method 1102, such as the method 200 of FIG. 2. In another embodiment, the processor-executable instructions 1104 are configured to implement a system, such as the system 100 of FIG. 1. Many such computer-readable media are devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

FIG. 12 and the following discussion provide a description of a suitable computing environment to implement embodiments of one or more of the provisions set forth herein. The operating environment of FIG. 12 is only one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, and the like.

Generally, embodiments are described in the general context of "computer readable instructions" being executed by one or more computing devices. Computer readable instructions are distributed via computer readable media as will be discussed below. Computer readable instructions are implemented as program modules, such as functions, objects, Application Programming Interfaces (APIs), data structures, and the like, that perform particular tasks or implement particular abstract data types. Typically, the functionality of the computer readable instructions are combined or distributed as desired in various environments.

FIG. 12 illustrates a system 1200 including a computing device 1212 configured to implement one or more embodiments provided herein. In one configuration, computing device 1212 includes at least one processing unit 1216 and memory 1218. Depending on the exact configuration and type of computing device, memory 1218 may be volatile, such as RAM, non-volatile, such as ROM, flash memory, etc., or a combination of the two. This configuration is illustrated in FIG. 12 by dashed line 1214.

In other embodiments, device 1212 includes additional features or functionality. For example, device 1212 also includes additional storage such as removable storage or non-removable storage, including, but not limited to, magnetic storage, optical storage, and the like. Such additional storage is illustrated in FIG. 12 by storage 1220. In one or more embodiments, computer readable instructions to implement one or more embodiments provided herein are in storage 1220. Storage 1220 also stores other computer readable instructions to implement an operating system, an application program, and the like. Computer readable instructions are loaded in memory 1218 for execution by processing unit 1216, for example.

The term "computer readable media" as used herein includes computer storage media. Computer storage media includes volatile and nonvolatile, removable and non-removable media implemented in any method or technology for storage of information such as computer readable instructions or other data. Memory 1218 and storage 1220 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1212. Any such computer storage media is part of device 1212.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 1212 includes input device(s) 1224 such as keyboard, mouse, pen, voice input device, touch input device, infrared cameras, video input devices, or any other input device. Output device(s) 1222 such as one or more displays, speakers, printers, or any other output device are also included in device 1212. Input device(s) 1224 and output device(s) 1222 are connected to device 1212 via a wired connection, wireless connection, or any combination thereof. In one or more embodiments, an input device or an output device from another computing device are used as input device(s) 1224 or output device(s) 1222 for computing device 1212. Device 1212 also includes communication connection(s) 1226 to facilitate communications with one or more other devices.

According to one or more aspects, a method for curriculum assessment is provided, including receiving one or more assessment parameters, one or more of the assessment parameters indicative of a textbook, a chapter, or a curriculum, selecting one or more formats for one or more questions of one or more assessments to be generated, and generating one or more assessments based on one or more of the assessment parameters and one or more of the formats. One or more of the questions of one or more of the assessments can comprise standardized content. One or more of the questions of one or more the assessments can be multiple choice, short answer, essay, or true/false. Additionally, one or more of the assessments can comprise one or more registration marks or one or more identifiers. In one or more embodiments, one or more of the identifiers is a quick response (QR) code or a bar code. These identifiers can be indicative of one or more questions of one or more of the corresponding assessments. In other words, an identifier can contain metadata about an assessment.

The method can include storing one or more portions of one or more of the assessments, receiving one or more assessee responses associated with one or more assessees for one or more of the assessments, or grading one or more of the assessee responses according to an answer key.

According to one or more aspects, a system for curriculum assessment curriculum assessment is provided, including a creation component configured to generate one or more assessments based on one or more assessment parameters. The system can include, an assessment component configured to grade one or more portions of one or more of the assessments. The assessment component can be configured to receive one or more scores for one or more other portions of one or more of the assessments. The system can include a reporting component configured to generate one or more reports of one or more of the assessments.

Additionally, the system can include a network component configured to receive one or more assessee responses for one or more of the assessments, a capture component configured to capture one or more assessment images of one or more of the assessments, a content database configured to store one or more questions for one or more of the assessments, a storage component configured to store one or more assessment images captured from one or more of the assessments, or an audio component configured to capture one or more audio clips associated with one or more questions of one or more of the assessments.

According to one or more aspects, a computer-readable storage medium comprising computer-executable instructions, which when executed via a processing unit on a computer performs acts is provided, including receiving one or more assessment parameters, one or more of the assessment parameters indicative of a textbook, a chapter, or a curriculum, selecting one or more formats for one or more questions of one or more assessments to be generated, generating one or more assessments based on one or more of the assessment parameters and one or more of the formats.

In one or more embodiments, one or more of the assessments can comprise one or more registration marks. Additionally, one or more of the assessments can comprise one or more identifiers. One or more of the identifiers is a quick response (QR) code or a bar code.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". In addition, "a" and "an" as used in this application are generally construed to mean "one or more" unless specified otherwise or clear from context to be directed to a singular form. Also, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel.

Also, although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A method for curriculum assessment, comprising:
    determining an assessment parameter, the assessment parameter indicative of a textbook, a chapter, or a curriculum;
    selecting a question based on an identification of a weakness of an assessee, wherein the selected question comprises a short-answer question;
    selecting a format for the question of an assessment to be generated;
    generating the assessment based on the assessment parameter and the format, and the selected question wherein the assessment comprises a registration mark;
    printing, by a printing device, on a sheet of paper, the selected question in the selected format wherein the printed paper comprises a section for a handwritten response to the short-answer question;
    scanning, by a scanning device, an assessee response associated with an assessee for the assessment, and
    determining, by the scanning device, an orientation of the assessment based on the registration mark on the assessment;
    recording, by an audio sensor, audio clip, wherein the audio clip comprises a portion of the assessee response; and
    identifying and evaluating the audio clip by processing audio and outputting as sheet music of what was actually submitted for comparison against sheet music of a requested or expected music, wherein the determining, the selecting of the question, the selecting of the format, the generating, the identifying and the evaluating, is implemented via a processing unit.

2. The method of claim 1, wherein the question of the assessment comprises standardized content.

3. The method of claim 1, wherein the question of the assessment is at least one of multiple choice, short answer, essay, or true/false.

4. The method of claim 1, comprising storing a portion of the assessment.

5. The method of claim 1, wherein the assessment comprises an identifier.

6. The method of claim 5, wherein the identifier is a quick response (QR) code or a bar code.

7. The method of claim 5, wherein the identifier is indicative of the question of the corresponding assessment.

8. The method of claim 1, comprising grading the assessee response according to an answer key.

9. The method of claim 1, comprising:
    capturing an image of the assessee to confirm the identity of the assessee associated with the assessment.

10. The method of claim 1, wherein the identifying and evaluating the audio clip comprises comparing to the key audio files and annotating anomalies.

11. The method of claim 1, wherein the identifying and evaluating the audio clip comprises a selected one of presenting and playing back the audio clip for the grader to evaluate.

12. A system for curriculum assessment, comprising:
    a creation component configured to generate an assessment based on an assessment parameter, wherein the assessment parameter is an one or more identified weakness of an assessee;
    a printing device configured to print the assessment on a sheet of paper, wherein the assessment comprises an answer section for a handwritten response to a short-answer question;
    a scanning device that scans an assessee response associated with the assessment, wherein the scanning device determines an orientation of the assessee response based on a registration mark;
    an audio recording device configured to record audio clip associated with the assessee response; and
    an assessment component configured to grade a portion of the assessee response based on the scanned assessee response and the audio clip and configured to identify and evaluate the audio clip by processing audio and outputting as sheet music of what was actually submitted for comparison against sheet music of a requested or expected music; and
    a reporting component configured to generate a report of the assessee response, wherein the creation component, the scanning device, the assessment component, or the reporting component is implemented via a processing unit.

13. The system of claim 12, comprising a network component configured to receive the assessee response for the assessment.

14. The system of claim 12, comprising a capture component configured to capture an assessment image of the assessee response or a file associated with the assessee response for the assessment.

15. The system of claim 12, comprising a content database configured to store the question for the assessment.

16. The system of claim 12, comprising a storage component configured to store the assessment image captured from the assessee response.

17. The system of claim 12, comprising an audio component configured to identify and evaluating the audio clip by comparing to the key audio files and annotating anomalies.

18. The system of claim 12, comprising an audio component configured to identify and evaluating the audio clip by a selected one of presenting and playing back the audio clip for the grader to evaluate.

19. A non-transitory computer-readable storage medium comprising computer-executable instructions, which when executed via a processing unit on a computer performs acts, comprising:
    receiving an assessment parameters, the assessment parameter indicative of a textbook, a chapter, or a curriculum;
    selecting a question based on an identification of a weakness of an assessee, wherein the selected questions comprises a short-answer question;
    selecting a format for the question of an assessment to be generated;
    generating the assessment based on the assessment parameter and the format and the selected question;
    printing on a sheet of paper, the selected question in the selected format wherein the printed paper comprises a section for a handwritten response to the short-answer question;
    scanning an assessee response associated with the assessee for the assessment, wherein the scanner recognizes an orientation of the assessment based on a registration mark;
    recording, by an audio sensor, audio clip, wherein the audio clip comprises a portion of the assessee response; and
    identifying and evaluating the audio clip by processing audio and outputting as sheet music of what was actually submitted for comparison against sheet music of a requested or expected music.

20. The computer-readable storage medium of claim 19, wherein the assessment comprises a plurality of registration marks.

21. The computer-readable storage medium of claim 19, wherein the assessment comprises an identifier.

22. The computer-readable storage medium of claim 21, wherein the identifiers is a quick response (QR) code or a bar code.

23. The non-transitory computer-readable storage medium of claim 19, comprising:
   capturing an image of the assessee to confirm the identity of the assessee associated with the assessment.

\* \* \* \* \*